United States Patent
Plate et al.

(10) Patent No.: US 12,361,142 B1
(45) Date of Patent: *Jul. 15, 2025

(54) IDENTIFYING AND ADDRESSING POTENTIAL VULNERABILITIES IN THIRD-PARTY CODE

(71) Applicant: Endor Labs Inc, Palo Alto, CA (US)

(72) Inventors: Henrik Plate, Valbonne (FR); Dimitrios Styliadis, San Jose, CA (US); Alexandre Wilhelm, Kilauea, HI (US)

(73) Assignee: Endor Labs Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/989,883

(22) Filed: Dec. 20, 2024

Related U.S. Application Data (63) Continuation of application No. 18/740,976, filed on Jun. 12, 2024, now Pat. No. 12,189,788.
(Continued)

(51) Int. Cl.
*G06F 21/57* (2013.01)
*G06F 21/62* (2013.01)
(Continued)

(52) U.S. Cl.
CPC ........ *G06F 21/577* (2013.01); *G06F 21/6218* (2013.01); *G06F 21/552* (2013.01); *G06F 21/565* (2013.01); *G06F 2221/033* (2013.01)

(58) Field of Classification Search
None
See application file for complete search history.

(56) References Cited

U.S. PATENT DOCUMENTS

| | | |
|---|---|---|
| 7,359,865 B1 | 4/2008 | Connor et al. |
| 9,064,134 B1 | 6/2015 | Agarwal |

(Continued)

FOREIGN PATENT DOCUMENTS

| | | | |
|---|---|---|---|
| CN | 112099838 A | * 12/2020 | ............... G06F 8/71 |
| CN | 112699377 A | 4/2021 | |

(Continued)

OTHER PUBLICATIONS

Antonino Sabetta, Michele Bezzi, A Practical Approach to the Automatic Classification of Security-Relevant Commits, Nov. 11, 2018, 7 pages.
(Continued)

*Primary Examiner* — Ali H. Cheema
(74) *Attorney, Agent, or Firm* — Flagship Patents; Shiv S. Naimpally (57) ABSTRACT

A non-transitory computer-readable media, method, and server for detecting and addressing vulnerabilities are described. For example, a server receives a security advisory of a vulnerability of a function in a third-party library, accesses a version control system of the third-party library to identify fix commits that address the vulnerability, determines files corresponding to functions in the third-party library that include the vulnerability, performs a comparison before and after a code change was made to the files, identifies functions that included the vulnerability and have been modified to address the vulnerability, performs a search for component versions that include the individual functions that included the vulnerability, generates an enriched vulnerability description that includes identifiers of package versions that include: fixed versions and vulnerable versions of the functions, and modifies project code in a development system to use the fixed versions of the functions.

17 Claims, 5 Drawing Sheets

Related U.S. Application Data (60) Provisional application No. 63/680,135, filed on Aug. 7, 2024, provisional application No. 63/552,793, filed on Feb. 13, 2024.

(51) Int. Cl.
  *G06F 21/55* (2013.01)
  *G06F 21/56* (2013.01)

(56) References Cited

U.S. PATENT DOCUMENTS

| | | | | |
|---|---|---|---|---|
| 9,557,968 | B1 * | 1/2017 | Smith | G06F 8/75 |
| 9,880,832 | B2 | 1/2018 | Plate et al. | |
| 10,108,975 | B1 | 10/2018 | Benner et al. | |
| 10,437,702 | B2 | 10/2019 | Kalech et al. | |
| 10,754,951 | B1 | 8/2020 | Tang et al. | |
| 11,204,690 | B1 * | 12/2021 | Hoberman | G06F 3/04842 |
| 12,164,647 | B2 | 12/2024 | Allen | |
| 2008/0052137 | A1 | 2/2008 | Ziade et al. | |
| 2008/0201705 | A1 | 8/2008 | Wookey | |
| 2009/0210717 | A1 * | 8/2009 | Segawa | H04L 63/08 |
| | | | | 713/176 |
| 2010/0185686 | A1 | 7/2010 | Weigert et al. | |
| 2010/0241469 | A1 | 9/2010 | Weigert | |
| 2010/0242028 | A1 | 9/2010 | Weigert | |
| 2011/0246982 | A1 | 10/2011 | Wookey | |
| 2013/0083030 | A1 | 4/2013 | Fukuda et al. | |
| 2016/0099963 | A1 | 4/2016 | Mahaffey et al. | |
| 2018/0197123 | A1 | 7/2018 | Parimelazhagan et al. | |
| 2018/0239898 | A1 * | 8/2018 | Haerterich | G06F 21/577 |
| 2018/0373507 | A1 | 12/2018 | Mizrahi et al. | |
| 2019/0114166 | A1 * | 4/2019 | Lakshmanan | G06F 8/71 |
| 2019/0138717 | A1 | 5/2019 | Ben-Shalom et al. | |
| 2020/0175174 | A1 | 6/2020 | Bakalli et al. | |
| 2021/0056209 | A1 | 2/2021 | Fox et al. | |
| 2021/0075814 | A1 | 3/2021 | Bulut et al. | |
| 2021/0141639 | A1 * | 5/2021 | Safronoff | G06F 8/658 |
| 2021/0182391 | A1 * | 6/2021 | Plate | G06N 20/00 |
| 2022/0398093 | A1 * | 12/2022 | Talmor | G06F 11/3698 |
| 2023/0004653 | A1 | 1/2023 | Shiraishi et al. | |
| 2023/0061121 | A1 | 3/2023 | Tosevska et al. | |
| 2024/0241963 | A1 * | 7/2024 | Wareus | G06F 21/577 |

FOREIGN PATENT DOCUMENTS

| | | | | | |
|---|---|---|---|---|---|
| CN | 115455431 | A | * | 12/2022 | |
| CN | 116266229 | A | * | 6/2023 | G06F 11/3608 |
| CN | 117235608 | A | | 12/2023 | |
| CN | 117235608 | B | | 12/2023 | |
| CN | 117667102 | A | | 3/2024 | |
| CN | 117668327 | A | | 3/2024 | |
| CN | 118734310 | A | * | 10/2024 | |
| EP | 3785126 | B1 | * | 11/2022 | G06F 11/3664 |
| JP | 2016024784 | A | * | 2/2016 | |
| WO | 2022222625 | A1 | | 10/2022 | |

OTHER PUBLICATIONS

Daan Hommersom, Antonino Sabetta, Automated Mapping of Vulnerability Advisories onto their Fix Commits in Open Source Repositories, Mar. 24, 2021, 28 pages.

Mehdi et al., "Frankenstein: fast and lightweight call graph generation for software builds", Aug. 30, 2023, 47 pages.

Mehdi Keshani, "Scalable Call Graph Constructor for Maven", Mar. 28, 2021, 3 pages.

Stephan Neuhaus, Thomas Zimmermann, Christian Holler and Andreas Zeller (Predicting Vulnerable Software Components);pp. 12; Published on Oct. 29-Nov. 2, 2007 12 pages.

Wenlin Xu, Tong Li, Jinsong Wang, and Yahui Tang (Detecting vulnerable software functions via text and dependency features);pp. 11; Published online: Jan. 7, 2023 11 pages.

* cited by examiner

IDENTIFYING AND ADDRESSING POTENTIAL VULNERABILITIES IN THIRD-PARTY CODE

RELATED APPLICATIONS

The present non-provisional patent application is a Continuation of U.S. patent application Ser. No. 18/740,976 filed on Jun. 12, 2024, which itself claims priority from (1) U.S. Provisional Application 63/552,793 filed on Feb. 13, 2024 and (2) U.S. Provisional Application 63/680,135 filed on Aug. 7, 2024, all of which are incorporated herein by reference in their entirety and for all purposes as if completely and fully set forth herein.

BACKGROUND

In recent years, software applications have increasingly relied on third-party components, many of which are released under open-source license. These components are typically declared as dependencies in the manifest files of the software applications, e.g., by specifying the name and version of the component to be used. Prebuilt open-source components or packages are made available on package registries. Package managers download these prebuilt packages from the registries according to the dependency declarations in the applications' manifest files, making the code included within these packages available in the applications' development or runtime environments.

However, these open-source components often suffer from security vulnerabilities, which can negatively impact the applications that use them, either directly or indirectly. To determine whether a particular application is affected by these vulnerabilities, code-level information about the vulnerability, such as the identifiers of vulnerable functions and the identifiers of components that include those functions, must be identified. Obtaining such information enables developers to employ program analysis techniques, such as static analysis or dynamic analysis, to study the vulnerable component and its use in the context of a given application. For example, reachability analysis, determines whether a particular function that is part of an open-source component can be reached by an application that directly or indirectly uses the particular function.

A significant challenge is that the necessary code-level information for these analyses is typically not included in the security advisories issued by open-source project maintainers or other bodies like the National Vulnerability Database (NVD). This lack of information necessitates providers of security tools or services to enrich public vulnerability information with this code-level information, a time-consuming and complex task. Various methods have been proposed to solve these issues. For example, manual analysis by security experts can provide the necessary information, but this approach is labor-intensive and not scalable. Automated vulnerability scanners can also provide some help, but they often rely on pattern matching or other heuristics that can lead to false positives or negatives. Moreover, these tools typically do not provide the detailed code-level information needed for a thorough analysis.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server receives a security advisory of a vulnerability of a function in a third-party library, accesses a version control system of the third-party library to identify fix commits that address the vulnerability, determines files corresponding to functions in the third-party library that include the vulnerability, performs a comparison before and after a code change was made to the files, identifies functions that included the vulnerability and have been modified to address the vulnerability, performs a search for component versions that include the individual functions that included the vulnerability, generates an enriched vulnerability description that includes identifiers of package versions that include: fixed versions and vulnerable versions of the functions, and modifies project code in a development system to use the fixed versions of the functions.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

It should be understood, however, that the following descriptions, while indicating preferred aspects and numerous specific details thereof, are given by way of illustration only and should not be treated as limitations. Changes and modifications may be made within the scope herein without departing from the spirit and scope thereof, and the present invention herein includes all such modifications.

The systems and techniques enhance the security of software applications that use third-party components. The systems and techniques may receive a vulnerability description from a security advisory, such as those published by the National Vulnerability Database (NVD). The vulnerability description provides a high-level overview of the security issue, including its potential impact and the affected software or hardware. After receiving the vulnerability description, the systems and techniques obtain access to a version control system (VCS) used by open-source maintainers to manage project artifacts. Examples of such VCS include Git and Mercurial. The VCS allows the maintainers to track changes to the source code files and other project artifacts. The systems and techniques may identify additional resources related to the vulnerability. These resources can include issues or tickets from the project's project management system, web resources, or social media posts. The identification of these resources can be done by crawling and searching the internet or by following links in the vulnerability description. Using the reference to the project's VCS, the systems and techniques generate a set of code changes performed by the project maintainers. These code changes may include commits, which include both the actual code changes and metadata, such as author information, a textual summary of the change, and timestamps. The systems and techniques may identify one or more fix commits, e.g., changes that modify the project's source code in such a way that the vulnerability is addressed (e.g., fixed or resolved). The identification of fix commits can be done using various techniques, including machine learning or artificial intelligence (AI). In some cases, the commit message, which is a textual description or summary of the changes, includes the vulnerability identifier or a description of the vulnerability similar to what's described in the vulnerability disclosure. In other cases, the code changes themselves can be analyzed to establish whether a given commit is related to the vulnerability. The systems and techniques may compare the timestamps of the commits and the publication dates of the vulnerability disclosure and the identified additional resources. This comparison can help to reduce the set of candidate commits and to identify those commits that are likely to be related to the vulnerability. Additional resources that can be useful for identifying fix commits include other documents that discuss or describe the vulnerability. These documents can be tickets in project management software, such as Jira, or resources describing how to exploit the vulnerability.

After the fix commits have been identified, the systems and techniques may identify the individual functions that were vulnerable and have been changed to address the vulnerability. This can be done by comparing the files before and after the change, either their textual representation or using various abstractions and representations of source code, such as abstract syntax trees. It is also desirable to exclude functions that are not directly related to the vulnerability. Such functions can be part of fix commits, if the developers performed other changes at the same time and included them in the commit. In other words, the developers did not limit the fix commit to changes related to the vulnerability. The resulting set can include both the signature of functions as well as function bodies or different representations thereof. These representations can include abstract syntax trees, data or control flow graphs, bytecode, or other forms of compiled code. The systems and techniques may take the affected functions as input and search for components and component versions including them. This may be done by obtaining packages from package registries, such as Maven Central or npm, and verifying whether they include the respective function in their vulnerable form or fixed form. Some package registries include a dedicated search function to facilitate this step, while others require downloading and indexing entire registries. In any case, the code part of downloaded packages may be searched for and compared against the affected functions, in order to establish not only whether the function is included, but also whether it is included in the vulnerable form or the fixed form. This comparison can involve the source code representation, abstractions thereof, such as abstract syntax trees or control flow graphs, as well as their compiled form.

The systems and techniques may produce as output an enriched vulnerability description, which includes information about the affected functions and the identifiers of package versions that include fixed or vulnerable versions of the affected functions.

The systems and techniques provide several advantages. For example, the systems and techniques allow for a more thorough and accurate identification of vulnerabilities in software applications that use third-party components. The systems and techniques enable developers to quickly identify and fix vulnerabilities, thereby improving (increasing) the security of their applications. The systems and techniques can be implemented in and used with a variety of programming languages, including, for example, Java, C++, Python, and JavaScript. The systems and techniques can be implemented in a variety of computing environments, including desktop computers, servers, cloud computing platforms, and mobile devices. The specific implementation can vary depending on the computing environment and the specific requirements of the software application and the third-party components it uses.

By identifying and addressing vulnerabilities in a timely and accurate manner, the systems and techniques can significantly reduce the risk of security breaches and increase the overall security of software applications. The systems and techniques can also contribute to the ongoing efforts to improve the security of open-source software, by providing a systematic and automated method for identifying and fixing vulnerabilities in open-source components. With the increasing use of open-source software in various industries, the systems and techniques can provide significant benefits in terms of improved security and reduced risk of security breaches.

The systems and techniques described increase the security of software applications that utilize third-party components. The systems and techniques provide a systematic approach to identifying and addressing vulnerabilities in third-party library functions and components. The systems and techniques enrich vulnerability descriptions with detailed code-level information, which is typically absent in existing vulnerability databases. In addition, artificial intelligence (AI) may be used to identify fix commits related to a vulnerability, thereby automating and improving the accuracy of the vulnerability identification process.

For example, enhancing software security may begin by receiving a high-level vulnerability description from a security advisory, such as those published by the National Vulnerability Database (NVD). The systems and techniques then obtain a reference to the version control system (VCS) used by open-source maintainers to manage project artifacts, particularly source code files. Additional resources related to the vulnerability, such as issues or tickets from the project's project management system, may also be identified. In some cases, a set of code changes performed by the project maintainers in the VCS may be identified. These code changes are made through commits, which include both the actual code changes and metadata, such as author information, a textual summary of the change, and timestamps.

The systems and techniques may determine the commits and additional resources and create a set of one or more fix commits. These are the changes that resolve the vulnerability in the project's source code. The identification of fix commits can be done using various techniques, including machine learning or artificial intelligence. In some cases, the commit message includes the vulnerability identifier or a description of the vulnerability. In other cases, the code changes themselves may be analyzed to determine whether a given commit is related to the vulnerability. Using the fix commits as input, the systems and techniques may identify the individual functions that were vulnerable and that have been modified to address the vulnerability. For example, this may done by comparing the files before and after the change, using either their textual representation or using various representations (e.g., abstractions) of source code, such as syntax trees. The systems and techniques may exclude functions that are not directly related to the vulnerability. The resulting set can include both the signature of functions as well as function bodies or different representations thereof. In some cases, the systems and techniques may take the affected functions as input and search for components and component versions that include them. This may be done by obtaining packages from package registries and verifying whether they include the respective function in their vulnerable form or fixed form. The code part of downloaded packages may be searched for and compared against the affected functions, to establish not only whether the function is included, but also whether it is included in the vulnerable or the fixed form. The systems and techniques may produce, as output, an enriched vulnerability description, which includes information about the affected functions and the identifiers of package versions that include fixed or vulnerable versions of the affected functions.

As an example, a server includes one or more processors and one or more non-transitory computer readable media storing instructions executable by the one or more processors to perform various operations. The operations include receiving a security advisory that include a description of a vulnerability. The operations include accessing a version control system (VCS) used by a third-party library. The operations include determining additional resources related to the vulnerability. The operations include determining a set of code changes performed by project maintainers in the VCS. The operations include identifying one or more fix commits that address the vulnerability. The operations include identifying one or more functions with the vulnerability that have been changed by the one or more fix commits. The operations include performing a search for components and component versions that include the one or more functions with the vulnerability. The operations include generating an enriched vulnerability description that includes identifiers of package versions that include: fixed versions of the one or more functions and vulnerable version of the one or more functions. The operations include modifying project code in a development system to use the fixed versions of the one or more functions. The operations may include comparing one or more files corresponding to the one or more functions before and after a code change was made and identifying individual functions of the one or more functions that included the vulnerability and that have been modified to address the vulnerability.

The operations may include determining a set of functions that are not directly related to the vulnerability and excluding from the search the set of functions that are not directly related to the vulnerability. The operations may include identifying, using an artificial intelligence, fix commits related to the vulnerability. The operations may include obtaining packages from one or more package registries and determining whether the packages include individual functions of the one or more functions in a vulnerable form or a fixed form. The third-party library may be an open-source library. The security advisory may be received from a security database.

Figure 1:
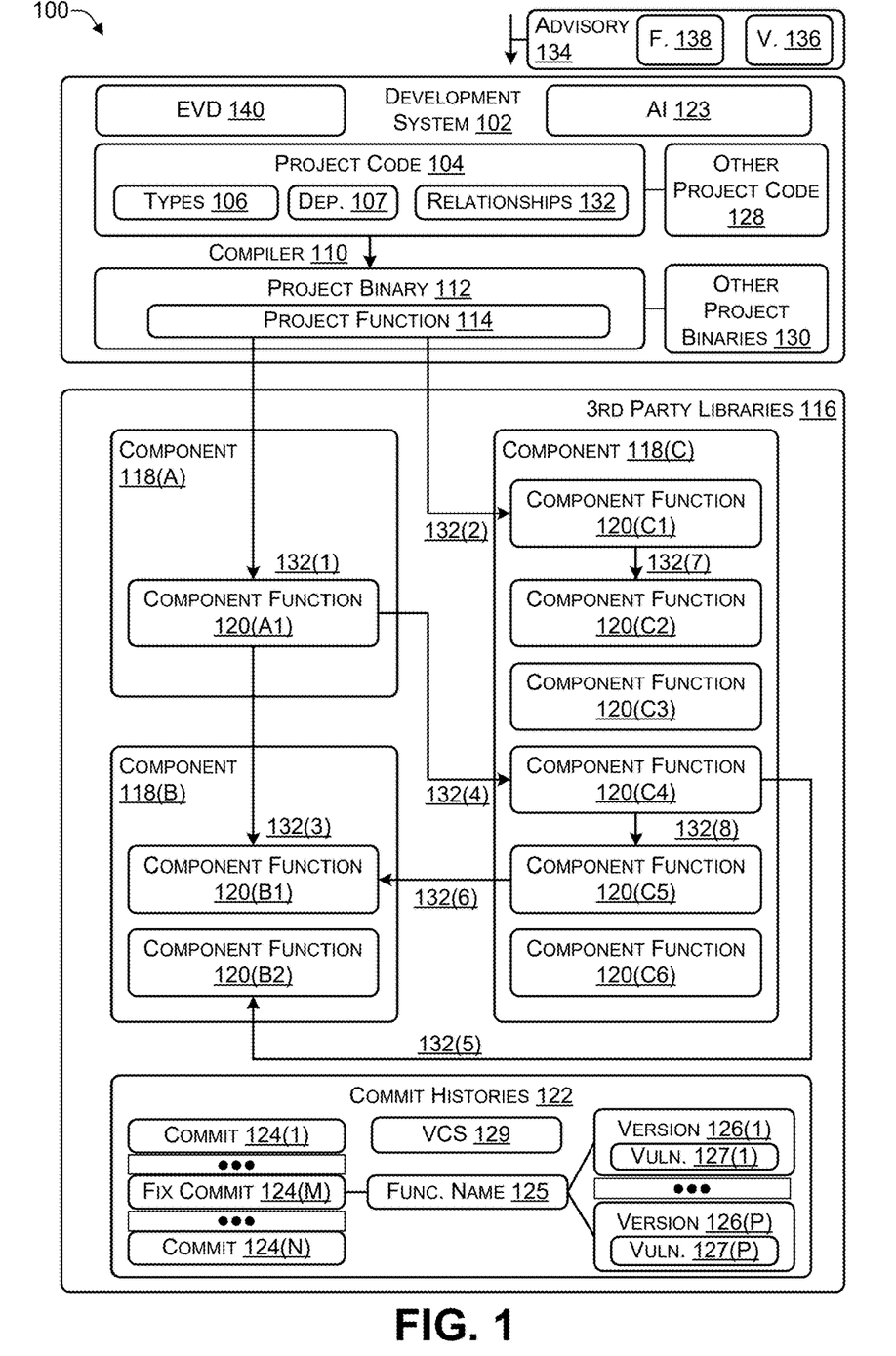
FIG. 1 is a system illustrating the components and relationships within a software development system, according to some embodiments.

FIG. 1 is a system 100 illustrating the components and relationships within a software development system, according to some embodiments. The system 100 includes a development system 102, project code 104, types 106, dependencies 107, a compiler 110, project binary 112, project function 114, 3rd party libraries 116, components 118(A), 118(B), 118(C), component functions 120(A1), 120(B1), 120(B2), 120(C1), 120(C2), 120(C3), 120(C4), 120(C5), 120(C6), commit histories 122, artificial intelligence (AI) 123, commits 124(1) to 124(N), where a commit 124(M) is fix commit (1<=M<=N), a function name 125, versions 126(1), 126(P), vulnerabilities 127(1), 127(P), other project code 128, other project binaries 130, and relationships 132(1), 132(2), 132(3), 132(4), 132(5), 132(6), 132(7), 132(8). The relationships may include any type of relationship between the project function 114 and component functions 120 in the third-party libraries 116.

The development system 102 is a software environment that allows software developers to facilitate the creation, modification, and management of the project code 104. The project code 104 includes the source code files of the software project that are managed using a version control system (VCS) 129, such as Git or Mercurial.

The types 106 and dependencies 107 are metadata associated with the project code 104. The types 106 can include information about the data types used in the project code 104, while the dependencies 107 can include information about the other software components that the project code (104) relies on for its functionality.

The compiler 110 is a software tool that transforms the project code 104 into a project binary 112. The project binary 112 is the executable form of the software project that can be run on a computer system. The project function 114 is a specific part of the project code 104 that performs a particular task within the software project.

The 3rd party libraries 116 are software components that are not developed by the project maintainers but are used within the software project to provide certain functionalities. These libraries can include components 118(A), 118(B), 118(C) that provide specific functionalities used by the project code 104.

The commit histories 122 are records of all the code changes performed (e.g., committed to the library) by the third part library maintainers. These changes are done by means of commits 124(1) to 124(N) (N>0), which include both the actual code changes, such as lines added, removed, or changed in the respective source code files, as well as metadata, including information such as author information, a textual summary of the change, timestamps, and the like.

The AI 123 is an artificial intelligence that can be used to identify fix commits (e.g., fix commit 124(M)) that resolve a particular vulnerability. A fix commit is a set of changes to the project's source code to address a vulnerability. The function name 125 is a unique identifier of a function (or set of functions) associated with the fix commit 124(M). The function associated with the function name 125 may include multiple versions 126(1) to 126(P), with each version 126 having a different set of code. The fix commit 124(M) may address a vulnerability 127 included in one or more of the versions 126 of the function name 125.

The other project code 128 and other project binaries (130) are additional software projects that are related to the main software project and included in the development system 102. The relationships 132(1), 132(2), 132(3), 132(4), 132(5), 132(6), 132(7), 132(8) represent various relationships between the project code 104 and the functions 120 in the third-party libraries 116.

The system 100 may receive, as input, an advisory 134 identifying a vulnerability 136 in a function 138 in one of the third-party libraries 116. The system 100 may search for components and component versions that include the vulnerability 136. This may done by obtaining packages from package registries, such as Maven Central or npm, and determining whether they include the function 138 in a vulnerable form (e.g., with the vulnerability 136) or a fixed form (e.g., without the vulnerability 136). This comparison can involve the source code representation, abstractions thereof, e.g. abstract syntax trees or control flow graphs, as well as their compiled form.

The system 100 may produce, as output, an enriched vulnerability description 140, which includes information about the affected functions, e.g., their signatures as well as representations of vulnerable and fixed function bodies, e.g., the source code as found in the VCS 129, or other representations, depending on the programming language in question, e.g. abstract syntax trees, control and data flow graphs, bytecode or compiled code. The identifiers of package versions that include fixed or vulnerable versions of the affected functions may be included in the output. By using the system 100, software developers can enhance the security of their software applications by identifying and resolving vulnerabilities in a more efficient and effective manner.

The system 100 includes the development system 102 used by one or more programmers to create code, such as representative project code 104. The project code 104 is also referred to as source code and is written in a high-level language. The project code 104 may include types 106 that are explicitly defined and implicitly inherited. The project code 104 includes relationships 108 that are explicitly defined and implicitly inherited. FIG. 1 is merely an example to illustrate the systems and techniques. It should be understood that in practice, the development system 102 may include multiple project code being developed and each project code, such as the representative project code 104, may include tens or even hundreds of calls to components in third-party libraries.

A compiler 110 may be used to compile the project code 104 to create a project binary 112. The project binary 112 may be an intermediate code (e.g., byte code) that is interpreted by a virtual machine, machine level code, or any combination thereof. The project binary 112 may implement at least one project function 114 to provide a particular type of functionality. The development system 102 may include other project code 128 and other project binaries 130 that are compiled versions of the other project code 128. The project code 104 may include dependencies 107 that identify portions of the other project code 128 that depends on (e.g., is called by or calls) the project code 128. The project binary 112 includes the dependencies 107, with portions of the other project binaries 130 depending on (e.g., called by or calling) the project binary 112.

The project function 114 makes a call to one or more components in one or more third-party libraries 116. The one or more third-party libraries 116 may include open-source libraries or other types of libraries. Each component function 120 shown in FIG. 1 is a compiled file that is in a binary or intermediate code (e.g., bytecode) format. For illustration purposes, three components 118(A), 118(B), and 118(C) are shown in the third-party libraries 116. However, it should be understood that these are merely examples and that the project function 114 may use hundreds or even thousands of components accessible via third-party libraries 116. For illustration purposes, the component 118(A) includes at least a component function 120(A1), the component 118(B) includes a component function 120(B1) and 120(B2), and the component 118(C) includes components functions 120(C1), 120(C2), 120(C3), 120(C4), 120(C5), and 120(C6).

For illustration purposes, the project function 114 makes a call 132(1) to component function 120(A1) and a call 132(2) to component function 120(C1). The component function 120(A1) makes a call 132(3) to component function 120(B1) and a call 132(4) to component function 120(C4). The component function 120(C4) makes a call 132(5) to component function 120(B2). The component function 120(C5) makes a call 132(6) to component function 120(B1). The component function 120(C1) makes a call 132(7) to component function 120(C2). The component function 120(C4) makes a call 132(8) to component function 120(C5). The calls made by the component functions (e.g., component function 120(A1)) to other component functions (e.g., component function 120(B1) and component function 120(C4)) are transitive calls from the perspective of the project function 114. For example, the component function 120(B1) is transitively called in two different paths: (1) the path comprising call 132(1) and call 132(3) and (2) the path comprising call 132(1), 132(4), 132(8), and 132(6).

In the example illustrated in FIG. 1, the project code 104 calls three components 118(A), 118(B), and 118(C) in one or more third-party libraries 116. The dependencies may be managed by a package manager which resolves dependency declarations specified in files of the project code 104. The project code 104 is compiled using the compiler 110 to a project binary 112. The binaries of the components are downloaded from package registries (e.g., Maven Central) during a build process. The project code 104 (e.g., first-party code) is developed in a particular context and includes the types 106. Each type of the types 106 inherits a type defined in component 118(C) because project function 114 calls various components 120 in the third-party libraries 116. For example, the project function 114 calls component function 120(C1) and therefore inherits the appropriate types from the component function 120(C1). The project code 104 has relationships 108, such as, for example, method invocation, class inheritance, annotation, interface implementation, field access and the like between other types and other functions included in components 118(A), 118(B), and 118(C).

Figure 2:
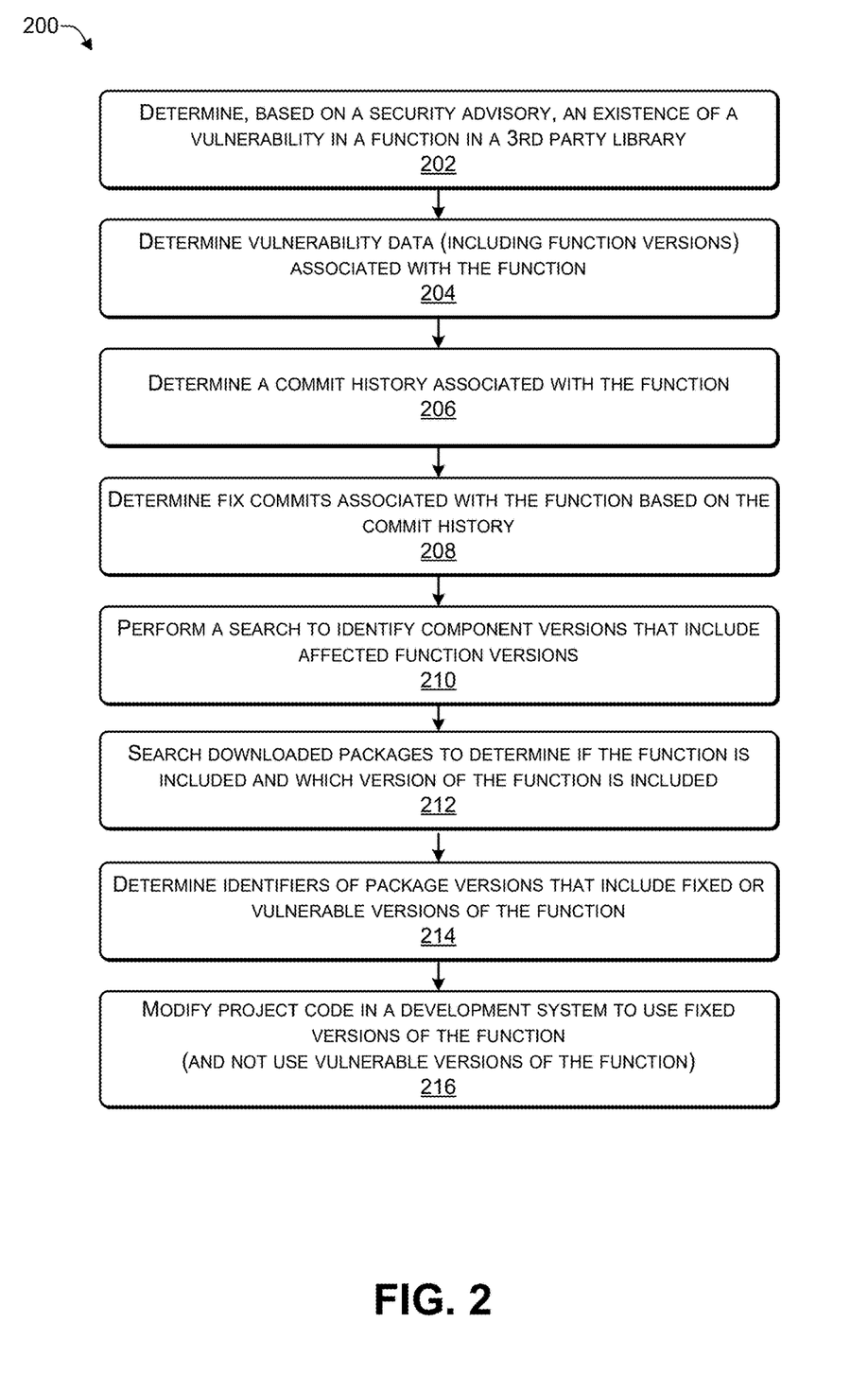
FIG. 2 is a process to identify and address vulnerabilities in third-party library functions, according to some embodiments.
Figure 3:
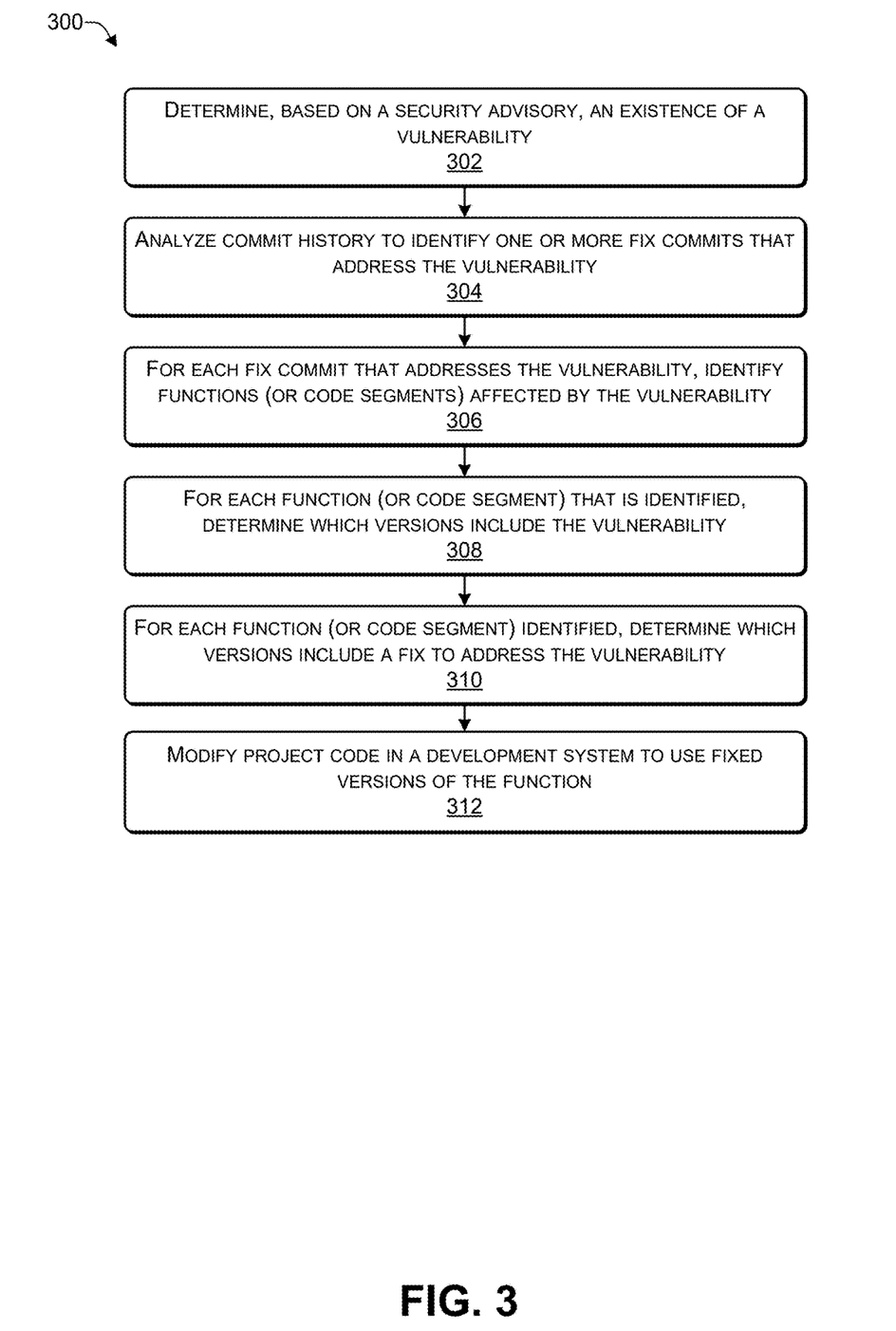
FIG. 3 is a process for identifying and addressing vulnerabilities in software based on security advisories and commit history analysis, according to some embodiments.
Figure 4:
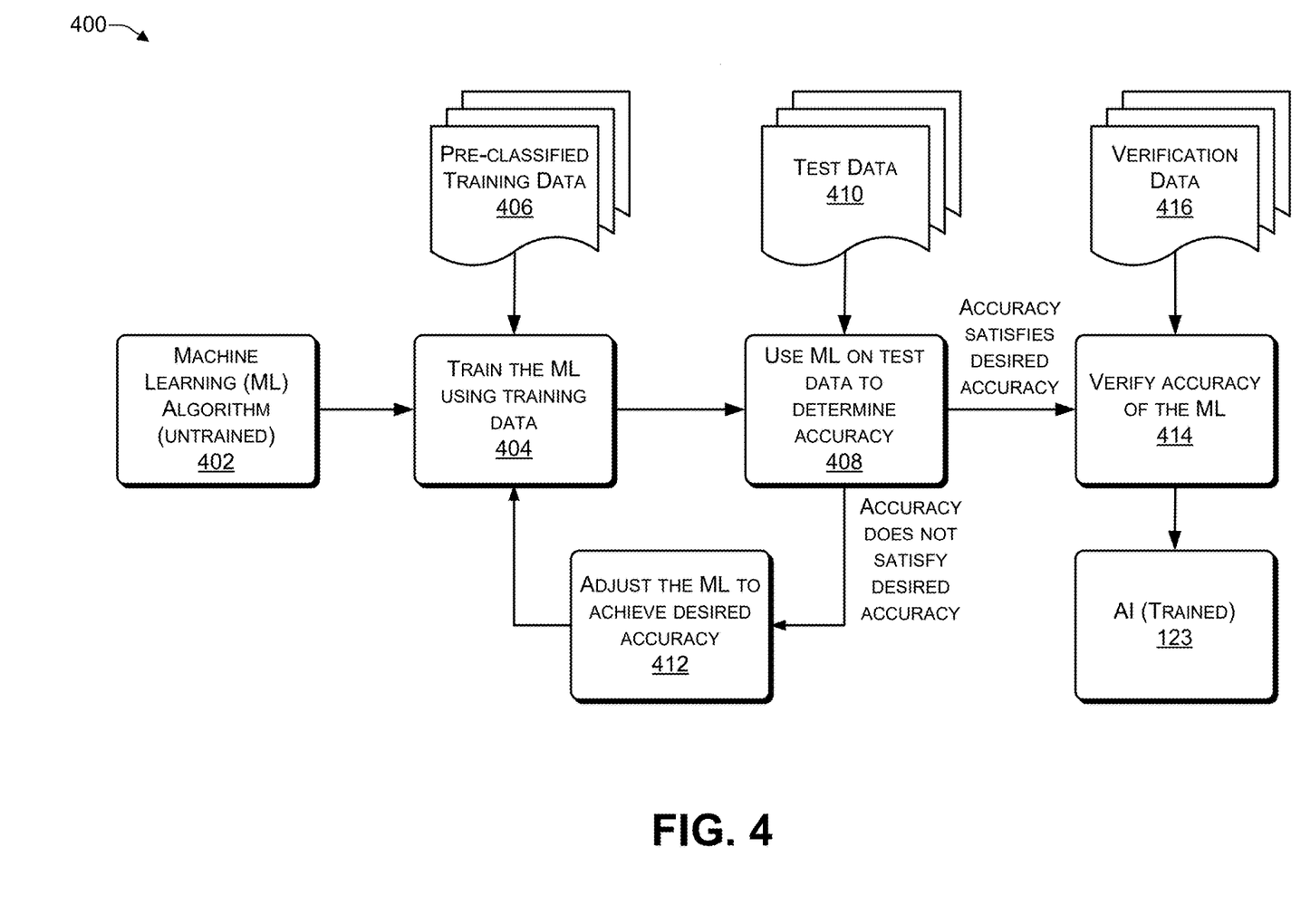
FIG. 4 is a process to train, test, and verify a machine learning algorithm to achieve a desired accuracy in identifying fix commits related to a vulnerability, according to some embodiments.

In the flow diagrams of FIGS. 2, 3, and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. The processes 100, 200, and 300 may be implemented using various models, frameworks, systems and environments.

FIG. 2 is a process 200 to identify and address vulnerabilities in third-party library functions, according to some embodiments. The process 200 determines whether an application is affected by a vulnerability in one or more open-source components used by the application by examining information about the vulnerability at the code-level (e.g., source code level, byte code level, or the like). For example, process 200 gathers information by examining the identifiers of functions with vulnerabilities and the identifiers of components that include (use) those functions. This information enables developers to use program analysis techniques, such as static analysis or dynamic analysis, to study the component and the use of the component in the context of a particular application. Using reachability analysis, the systems and techniques determine whether a particular function that is included in an open-source component can be reached (called by either directly or indirectly) by a downstream application. Reachability analysis is useful because applications may not use all the code (functions) provided by open-source components. The program analysis to identify potential vulnerabilities caused by using open-source code is typically not included in security advisories issued by those maintaining open-source projects or those maintaining databases of known vulnerabilities, such as the National Vulnerability Database (NVD). For this reason, providers of security tools and vulnerability analysis services may enhance public vulnerability information with code-level information to enable program analysis to identify potential vulnerabilities in applications that use open-source components.

FIG. 2 is a flowchart of a process 200 that includes identifying code vulnerabilities, according to some embodiments. The process 200 takes as input a high-level description of a vulnerability in an open-source component and produces as output an enriched vulnerability description that includes code-level information about affected functions and affected component versions.

At 202, the process determines, based on a security advisory, an existence of a vulnerability in a function in a third-party library. For example, in FIG. 1, the AI 123 may determine information about the vulnerability 136 in the function 138 from the security advisory 134. The security advisory 134 may be published by the NVD or another similar organization.

At 204, the process determines vulnerability data, including function versions associated with the function. For example, in FIG. 1, the AI 123 may collect project and vulnerability information, including a reference to the VCS 129 used by those maintaining open-source libraries, such as the third-party libraries 116, to manage aspects for a project, including managing source code files, such as the project code 104. For example, Git and Mercurial are examples of a VCS. Collecting project and vulnerability information may include identifying additional resources related to the vulnerability 136, such as, for example, issues or tickets from a project management system. This information collection may be done starting from links in the vulnerability description 136, but may include crawling and searching Web resources, social media, and other internet-based information sources.

At 206, the process may determine a commit history associated with the function (that was identified in the security advisory). For example, in FIG. 1, the project's VCS 129 may be used to determine a set of code changes performed by those maintaining the project. Such code changes are done using commits 124, with each commit 124 including both (1) the actual code changes, e.g., lines of code that have been added, removed, and/or changed in particular source code files, as well as (2) metadata, such as author information, a textual summary of the changes, a timestamp, other change-related information, or any combination thereof.

At 208, the process may determine fix commits associated with the function, based on the commit history. For example, in FIG. 1, the commit history 122, the commits 124, and other information may be used to determine a set of one or more fix commits, e.g., a set of the particular changes (commits) that change the project's source code by fixing or otherwise resolving the vulnerability, such as the representative fix commit 124(M). The identification of fix commits may be done using various techniques, including using the AI 123. In some cases, the commits 124, which are a textual description or summary of the changes, may include either the function identifier 125 or a description of the vulnerability 127, similar to what is described in the vulnerability 136 information included in the advisory 134. In other cases, the code changes in the third-party libraries 116 may be analyzed to determine whether a particular commit 124 is related to the vulnerability 136. The set of candidate commits 124 may be reduced by comparing commit timestamps, publication dates of vulnerability disclosure, and the like. In some cases, additional resources may be used to identify fix commits, such as other documents that discuss or describe the vulnerability, e.g., tickets in project management software (e.g., Jira), or resources describing how to exploit the vulnerability.

The fix commits 118 may be used to identify functions 120 affected by the vulnerability 136 and to determine the functions 120 that have been modified to address the vulnerability by one of the commits 124. For example, this may be done by comparing the files before and after a change is made, using either their textual representation or using various abstractions and representations of source code, such as abstract syntax trees. In some cases, functions that are not directly related to the vulnerability 136 may be excluded to keep the data being analyzed to a manageable amount. For example, functions 120 may be included as part of fix commits (e.g., the fix commit 124(M)), if the developers, in addition to providing a fix for the vulnerability, performed other changes at the same time and included them in the commit, e.g., the fix commit was not limited to the vulnerability. A resulting set of functions, such as the representative function name 125, may include both (1) the signature of the respective function, as well as (2) different representations of the functions, such as, for example, abstract syntax trees, data or control flow graphs, bytecode, and the like.

At 210, the process may perform a search to identify components and component versions that include the affected functions (e.g., functions affected by the vulnerability). At 212, the process may search downloaded packages to determine if the function affected by the vulnerability is included and if so which version of the function is included. At 214, the process may determine identifiers of package versions that include fixed or vulnerable versions of the function. For example, in FIG. 1, such a search may be performed by obtaining packages from package registries (e.g., the third-party libraries 116, such as Maven Central, npm registry, or the like) and determining whether they include the function in the vulnerable form or in the fixed form 112. For example, some package registries may provide a search function to facilitate performing such a search, while other package registries may be downloaded and indexed to enable the entire package registries to be searched. In some cases, the code portion of downloaded packages may be searched and compared against affected functions to determine not only whether the function is included, but whether the function is included in the vulnerable form or the fixed form (vulnerability addressed). Such a comparison may involve the source code representation, abstractions thereof (e.g., abstract syntax trees or control flow graphs), their compiled form, or any combination thereof. The result is an enhanced vulnerability description 140 that includes information about functions affected by one or more vulnerabilities, including their signatures as well as representations of vulnerable and fixed function bodies, e.g., the source code as found in the VCS, or other representations, depending on the programming language, as well as abstract syntax trees, control and data flow graphs, bytecode, compiled code, or any combination thereof. In some cases, the results may include identifiers of package versions that include fixed or vulnerable versions of the affected functions. Vulnerable functions within the context of software development projects may be identified by searching the commit history of an open-source project (e.g., Github) repository for fixes. In addition, vulnerability databases, such as npm and the like, that document vulnerabilities for which a fix is available, may be searched. At 216, project code in a development system may be modified in such a way that the project code uses the fixed versions of the function and does not use vulnerable version of the function. For example, in FIG. 1, a code developer or the AI 123 may automatically (without human interaction) modify the project code 104 to use the fixed versions of a function and not use versions of the function that include the vulnerability 136.

Thus, the system 100 may augment vulnerability databases using various types of analysis, including reachability analysis. The system 100 may query vulnerability databases for component names of components that include a vulnerability. In many systems, such as the Java ecosystem, code that includes a vulnerability may be copied and used in multiple components with each of the multiple components having different names. Thus, the systems and techniques search third-party libraries for code segments that include known vulnerabilities, including code segments that have been reused in multiple components.

An example of JSON code with a vulnerability is as follows:

{"schema_version": "v1", "deepdive": false, "disputed": false, "nofix": false, "cve_id": "CVE-2015-5344", "cve_description": "The camel-xstream component in Apache Camel before 2.15.5 and 2.16.x before 2.16.1 allow remote attackers to execute arbitrary commands via a crafted serialized Java object in an HTTP request.", "cvss_score": 9.8, "cvss_vector": "CVSS: 3.1/AV: N/AC: L/PR: N/UI: N/S: U/C: H/I: H/A: H", "cwe": "19", "cve_references": ["camel.apache.org/security/CVE-2015-5344.txt.asc", "github.com/advisories/GHSA-gv5f-cjw9-5vxg"], "package_name": "camel", "ecosystem": "maven", "fix_commit": ["github.com/apache/camel/commit/369d0a6d605055cb843e7962b101e3bbcd113fec", "github.com/apache/camel/commit/4cdc6b177ee7391eedc9f0b695c05d56f84b0812", "github.com/apache/camel/commit/b7afb3769a38b8e526f8046414d4a71430d77df0", "github.com/apache/camel/commit/157c0b4a3c8017de432f1c99f83e374e97dc4d36"], "additional_notes": "Note: cvss score/vector data added as per data from nvd. \n\n The vulnerability is fixed in multiple files, so we are adding vulnerable versions as per advisory.", "component": [{"group_id": "org.apache.camel", "artifact_id": "camel-xstream", "vulnerable_versions": ["1.3.0", "1.4.0", "1.5.0", "1.6.0", "1.6.1", "1.6.2", "1.6.3", "1.6.4", "2.0-M1", "2.0-M2", "2.0-M3", "2.0.0", "2.1.0", "2.2.0", "2.3.0", "2.4.0", "2.5.0", "2.6.0", "2.7.0", "2.7.1", "2.7.2", "2.7.3", "2.7.4", "2.7.5", "2.8.0", "2.8.1", "2.8.2", "2.8.3", "2.8.4", "2.8.5", "2.8.6", "2.9.0-RC1", "2.9.0", "2.9.1", "2.9.2", "2.9.3", "2.9.4", "2.9.5", "2.9.6", "2.9.7", "2.9.8", "2.10.0", "2.10.1", "2.10.2", "2.10.3", "2.10.4", "2.10.5", "2.10.6", "2.10.7", "2.11.0", "2.11.1", "2.11.2", "2.11.3", "2.11.4", "2.12.0", "2.12.1", "2.12.2", "2.12.3", "2.12.4", "2.12.5", "2.13.0", "2.13.1", "2.13.2", "2.13.3", "2.13.4", "2.14.0", "2.14.1", "2.14.2", "2.14.3", "2.14.4", "2.15.0", "2.15.1", "2.15.2", "2.15.3", "2.15.4", "2.16.0"], "fixed_versions": ["2.15.5", "2.16.1"], "vulnerable_filepath": ["org/apache/camel/dataformat/xstream/AbstractXStreamWrapper.class"], "versions_range": ["[1.3.0,2.15.5)", "[2.16.0,2.16.1)"], "endor_uri": ["/org.apache.camel.dataformat.xstream/AbstractXStreamWrapper.createXStream (/org.apache.camel.spi/ClassResolver,/java.lang/ClassLoader)/com.thoughtworks.xstream/XStream"]}, {"group_id": "org.apache.camel", "artifact_id": "camel-core", "vulnerable_versions": ["1.0.0", "1.1.0", "1.2.0", "1.3.0", "1.4.0", "1.5.0", "1.6.0", "1.6.1", "1.6.2", "1.6.3", "1.6.4", "2.0-M1", "2.0-M2", "2.0-M3", "2.0.0", "2.1.0", "2.2.0", "2.3.0", "2.4.0", "2.5.0", "2.6.0", "2.7.0", "2.7.1", "2.7.2", "2.7.3", "2.7.4", "2.7.5", "2.8.0", "2.8.1", "2.8.2", "2.8.3", "2.8.4", "2.8.5", "2.8.6", "2.9.0-RC1", "2.9.0", "2.9.1", "2.9.2", "2.9.3", "2.9.4", "2.9.5", "2.9.6", "2.9.7", "2.9.8", "2.10.0", "2.10.1", "2.10.2", "2.10.3", "2.10.4", "2.10.5", "2.10.6", "2.10.7", "2.11.0", "2.11.1", "2.11.2", "2.11.3", "2.11.4", "2.12.0", "2.12.1", "2.12.2", "2.12.3", "2.12.4", "2.12.5", "2.13.0", "2.13.1", "2.13.2", "2.13.3", "2.13.4", "2.14.0", "2.14.1", "2.14.2", "2.14.3", "2.14.4", "2.15.0", "2.15.1", "2.15.2", "2.15.3", "2.15.4", "2.16.0"], "fixed_versions": ["2.16.1", "2.15.5"] "vulnerable_filepath": ["org/apache/camel/model/dataformat/XStreamDataFormat.class", "org/apache/camel/builder/DataFormatClause.class", "org/apache/camel/model/dataformat/JsonDataFormat.class"], "versions_range": ["[2.16.0,2.16.1)", "[1.0.0,2.15.5)"], "endor_uri": ["/org.apache.camel.model.dataformat/XStreamDataFormat.configureDataFormat (/org.apache.camel.spi/DataFormat,/org.apache.camel/CamelContext)/java.lang/VoidType", "/org.apache.camel.model.dataformat/JsonDataFormat.configureDataFormat (/org.apache.camel.spi/DataFormat,/org.apache.camel/CamelContext)/java.lang/VoidType", "/org.apache.camel.builder/DataFormatClause.xstream (/java.lang/String)/org.apache.camel.model/ProcessorDefinition"]}, {"group_id": "org.apache.camel", "artifact_id": "camel-bundle", "vulnerable_versions": ["1.4.0", "1.5.0", "1.6.0", "1.6.1", "2.0-M1", "2.0-M2", "2.0-M3" 1, "fixed_versions": [ ], "vulnerable_filepath": ["org/apache/camel/dataformat/xstream/AbstractXStreamWrapper.class"], "versions_range": ["[1.3.0,2.15.5)", "[2.16.0,2.16.1)"], "endor_uri": ["/org.apache.camel.dataformat.xstream/AbstractXStreamWrapper.createXStream (/org.apache.camel.spi/ClassResolver,/java.lang/ClassLoader)/com.thoughtworks.xstream/XStream"]}, {"group_id ": "org.apache.camel", "artifact_id": "apache-camel", "vulnerable_versions": ["1.3.0"], "fixed_versions": [ ], "vulnerable_filepath": ["org/apache/camel/dataformat/xstream/AbstractXStreamWrapper.class"], "versions_range": ["[1.3.0,2.15.5)", "[2.16.0,2.16.1)"], "endor_uri": ["/org.apache.camel.dataformat.xstream/AbstractXStreamWrapper.createXStream (/org.apache.camel.spi/ClassResolver,/java.lang/ClassLoader)/com.thoughtworks.xstream/XStream"]}]}

A fixed commit is developed by those maintaining a third-party library to resolve issues. In some cases, automated tools (e.g., AI/ML) may be used to search for and identify security-related code changes. Identifying vulnerable code within a project may include extracting components from a fixed commit and determining whether the vulnerability can be reached from an application (e.g., project code). Reachability analysis is used to determine whether a vulnerability is reachable by the application. If the reachability analysis determines that the vulnerability is reachable, the vulnerability is given a higher priority for fixing. The systems and techniques may identify multiple components in the third-party library that include the vulnerability. For example, a database may be searched to find all component identifiers that include vulnerabilities. The systems and techniques may keep track of versions of a component in a third-party library, including a first set of versions that have a vulnerability and a second set of versions that have the vulnerability addressed (e.g., using a committed fix).

Thus, after receiving a vulnerability description the process may produce an enriched vulnerability description, thereby enhancing the security of software applications that use third-party components. The process begins with the receipt of a high-level vulnerability description from a security advisory. This is typically published by the National Vulnerability Database (NVD) or a similar vulnerability alerting system. The vulnerability description provides an initial understanding of the potential security risk associated with a particular software component or function. Vulnerability data is determined by accessing a version control system (VCS) used by open source maintainers to manage project artifacts, such as source code files. Examples of such VCS systems include Git or Mercurial. In addition to the VCS, additional resources related to the vulnerability may be identified, such as issues or tickets from the project's project management system. This information collection can be done starting from links in the vulnerability description, or may include crawling and searching Web resources. The next step in the process involves determining the commit history, e.g., a set of the code changes performed by the project maintainers in the VCS. These code changes are done by means of commits, which include both the actual code changes, such as lines added, removed, or changed in the respective source code files, as well as metadata such as author information, a textual summary of the change, or timestamps. After the commit history is determined, the process moves to the determination of fix commits by identifying one or more fix commits, e.g., those changes that alter the project's source code in such a way that the vulnerability is fixed or resolved. The identification of fix commits can be done using various techniques, including artificial intelligence (AI). The next step in the process involves identifying the component versions. This is done by comparing the files before and after the change, either using their textual representation or using various abstractions and representations of source code, such as abstract syntax trees. In some cases, functions that are not directly related to the vulnerability may be excluded to keep the size manageable. The process may then search downloaded packages by searching for components and component versions that include the functions with the vulnerability. This may be done by obtaining packages from package registries like Maven Central, npm, and the like and verifying whether they include the respective function in their vulnerable or fixed form. The process may determine the identifiers of package versions. The result of the process is an enriched vulnerability description, which includes information about the affected functions and the identifiers of package versions that include fixed or vulnerable versions of the affected functions. The result is a detailed and comprehensive understanding of the vulnerability, its impact, and the necessary steps to address it.

FIG. 3 is a process 300 for identifying and addressing vulnerabilities in software based on security advisories and commit history analysis, according to some embodiments. The process 300 may be performed by one or more components of the system 100, such as the AI 123 of FIG. 1.

At 302, the process determines, based on a security advisory, an existence of a vulnerability. At 304, the process may analyze a commit history to identify one or more fix commits that address the vulnerability. At 306, for each fix commit that addresses the vulnerability, the process may identify functions (or code segments) affected by the vulnerability. At 308, for each function (or code segment) that is identified as being affected by the vulnerability, the process may determine which versions include the vulnerability. At 310, for each function (or code segment) that is identified as being affected by the vulnerability, determine which versions include a fix to address the vulnerability. At 312, project code in a development system may be modified in such a way that the project code uses the fixed versions of the function and does not use vulnerable version of the function.

For example, in FIG. 1, after receiving the security advisory 134, the AI 123 may become aware of the existence of the vulnerability 136. The AI 123 may analyze the commit histories 122 of each of the third-party libraries 116 to identify one or more fix commits (e.g., the representative fix commit 124(M)) that address the vulnerability 136. For each fix commit that addresses the vulnerability 136, the AI 123 may identify one or more of the functions 120 (or code segments included in the functions 120) affected by the vulnerability 136. For each function 120 (or code segment) that is identified as being affected by the vulnerability 136, the AI 123 may determine which versions 126 include the vulnerability. For each function 120 (or code segment) that is identified as being affected by the vulnerability 136, the AI 123 may determine which versions 126 include a fix to address the vulnerability 136. A code developer or the AI 123 may automatically (without human interaction) modify the project code 104 to use the fixed versions of a function and not use versions of the function that include the vulnerability 136.

Thus, a vulnerability is determined after receiving a high-level vulnerability description from a security advisory, such as those published by the National Vulnerability Database (NVD). The version control system (VCS) that is used by the open source maintainers to manage the project artifacts, including source code files, may be obtained. Examples of such VCS include Git or Mercurial. The commit history is analyzed by using the project's VCS to produce a set of the code changes performed by the project maintainers. Such code changes are done by means of commits, which include both the actual code changes, for example, lines added, removed or changed in the respective source code files, as well as metadata such as author information, a textual summary of the change, or timestamps. After analyzing the commit history, the process identifies fix commit functions. The commits and additional resources related to the vulnerability are used to produce a set of one or more fix commits, e.g., changes that modify the project's source code in such a way that the vulnerability is fixed or resolved. The identification of fix commits can be done using various techniques, including using artificial intelligence. In some cases, the commit message, which is a textual description or summary of the changes, includes the vulnerability identifier or a description of the vulnerability similar to what's described in the vulnerability disclosure. Function versions that include the vulnerability are determined, using the fix commits, by identifying the individual functions that were vulnerable and that have been modified to address the vulnerability. For example, the files before and after the change may be compared, either using their textual representation or using various abstractions and representations of source code, such as abstract syntax trees. In some cases, functions not directly related to the vulnerability may be excluded to keep the size manageable. Such functions can be part of fix commits, if the developers performed other changes at the same time and included them in the commit, i.e., they did not limit the fix commit to changes related to the vulnerability. Versions that include the fix may be identified by taking the affected functions searching for components and component versions that include the fix. This may be done by obtaining packages from package registries like Maven Central, npm, or the like and verifying whether they include the respective function in their vulnerable or fixed form. Some package registries include a dedicated search function to facilitate this step, while others require downloading and indexing entire registries. The code part of downloaded packages need to be searched for and compared against the affected functions, in order to establish not only whether the function is included, but also whether it is included in the vulnerable or the fixed form. This comparison can involve the source code representation, abstractions thereof, such as abstract syntax trees or control flow graphs, as well as their compiled form. This produces the enriched vulnerability description, which includes information about the affected functions and the identifiers of package versions that include fixed or vulnerable versions of the affected functions.

FIG. 4 is a flowchart of a process to train an artificial intelligence (AI) algorithm, according to some embodiments. For example, the process 400 may be performed by the computing device 500 of FIG. 5 to create the AI 123 of FIG. 1.

At 402, a machine learning algorithm (e.g., software code that has not yet been trained) may be created by one or more software designers. At 404, the machine learning algorithm may be trained using pre-classified training data 406 (e.g., a portion of the training data 112 that has been pre-classified). For example, the training data 406 may have been pre-classified by humans, by machine learning, or a combination of both. After the machine learning has been trained using the pre-classified training data 406, the machine learning may be tested, at 408, using test data 410 to determine an accuracy of the machine learning. For example, in the case of a classifier, the accuracy of the classification may be determined using the test data 410.

If an accuracy of the machine learning does not satisfy a desired accuracy (e.g., 95%, 98%, 99% accurate), at 408, then the machine learning code may be modified (e.g., adjusted), at 412, to achieve the desired accuracy. For example, at 412, the software designers may modify the machine learning software code to improve the accuracy of the machine learning algorithm. After the machine learning has been tuned, at 412, the machine learning may be retrained, at 404, using the pre-classified training data 406. In this way, 404, 408, 412 may be repeated until the machine learning is able to classify the test data 410 with the desired accuracy.

After determining, at 408, that an accuracy of the machine learning satisfies the desired accuracy, the process may proceed to 414, where verification data 416 may be used to verify an accuracy of the machine learning. After the accuracy of the machine learning is verified, at 414, the result is the trained AI 123 of FIG. 1, which has been trained to perform the analysis described herein.

Figure 5:
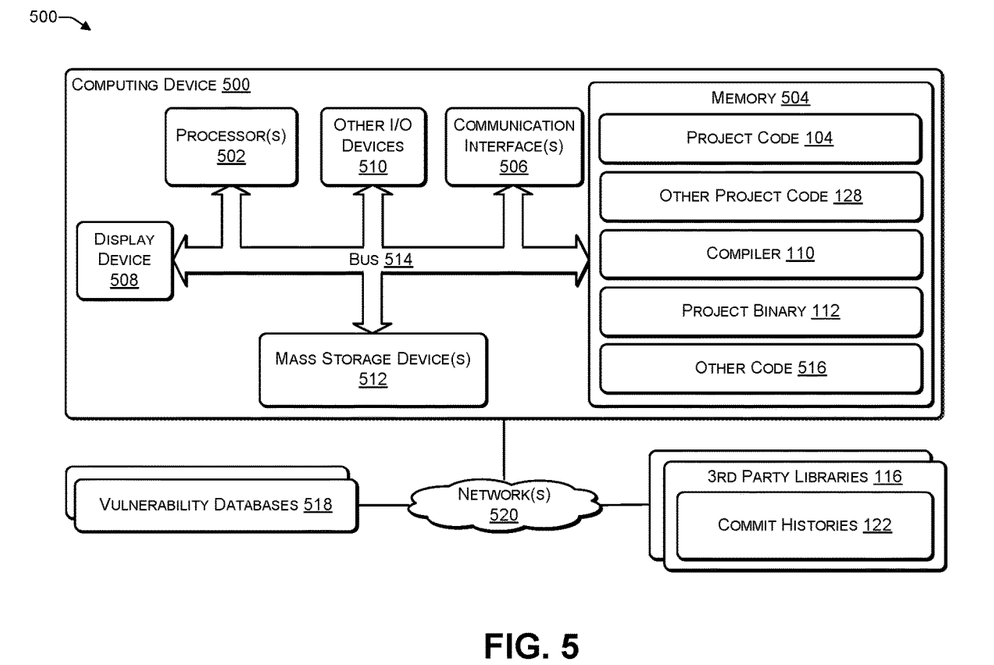
FIG. 5 is a block diagram of a computing device with memory, processors, storage, and network components for vulnerability management, highlighting the various modules configured to perform the steps of the vulnerability identification and addressing process.

FIG. 5 illustrates an example configuration of a computing device that can be used to implement the systems and techniques described herein, such as hosting the development system 102 of FIG. 1 or being used to train the AI 123. The computing device 500 may include one or more processors 502 (e.g., central processing unit (CPU), graphics processing unit (GPU), AI processing units (AIPU), or any combination thereof), a memory 504, communication interfaces 506, a display device 508, other input/output (I/O) devices 510 (e.g., keyboard, trackball, and the like), and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., Thunder-Bolt®, digital video interface (DVI), High-Definition Multimedia Interface (HDMI), and the like), power buses, etc.

The processors 502 are one or more hardware devices that may include a single processing unit or a number of processing units, all of which may include single or multiple computing units or multiple cores. The processors 502 may include a GPU and/or AIPU that is integrated into the CPU or the GPU and/or AIPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 are configured to fetch and execute computer-readable instructions stored in the memory 504, mass storage devices 512, and other types of non-transitory computer-readable media.

Memory 504 and mass storage devices 512 are examples of non-transitory computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 504 and mass storage devices 512 may be collectively referred to as memory or computer storage media herein and include any type of non-transitory media capable of storing computer-readable, processor-executable program instructions as computer program code that can be executed by the processors 502 as a particular machine configured for carrying out the operations and functions described in the implementations herein.

The computing device 500 may include one or more communication interfaces 506 for exchanging data via the network(s) 106. The communication interfaces 506 can facilitate communications within a wide variety of networks and protocol types, such as a representative network 516 that may include wired networks (e.g., Ethernet®, Data Over Cable Service Interface Specification (DOCSIS), Digital Subscriber Line (DSL), Fiber optic cable, universal serial bus (USB) etc.) and wireless networks (e.g., wireless local area network (WLAN), global system for mobile (GSM), code division multiple access (CDMA), 802.11, Bluetooth®, Wireless USB, ZigBee, other cellular transmission protocols, satellite, etc.), the Internet and the like. Communication interfaces 506 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth.

The computer storage media, such as memory 504 and mass storage devices 512, may be used to store software and data as shown in FIG. 5. For example, the memory 504 may be used to store the project code 104, other project code 128, the compiler 110, the project binary 112, and other code 516. The computing device 500 may be connected to one or more vulnerability databases 518 and the third-party libraries 116 via one or more networks 520.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method executed by one or more processors of a computer, the method comprising:
    receiving, via a device network, a security advisory comprising a description of a vulnerability associated with a function in a third-party library;
    accessing, via the device network, a version control system (VCS) of the third-party library;
    identifying, using the VCS of the third-party library, one or more fix commits that address the vulnerability;
    determining one or more files corresponding to one or more functions in the third-party library that include the vulnerability;
    performing a comparison before a code change was made to the one or more files and after the code change was made to the one or more files;
    identifying, based on the comparison, individual functions of the one or more functions that included the vulnerability and have been modified to address the vulnerability;
    determining a set of functions that are not directly related to the vulnerability;
    performing a search, and excluding from the search the set of functions that are not directly related to the vulnerability, for component versions that include the individual functions that included the vulnerability;
    generating an enriched vulnerability description that includes identifiers of package versions that include:
        fixed versions of the one or more functions; and
        vulnerable versions of the one or more functions; and
    modifying project code in a development system to use the fixed versions of the one or more functions.

2. The method of claim 1, wherein the description of the vulnerability includes: a potential impact of a security issue associated with the vulnerability including: software affected by the security issue; or hardware affected by the security issue.

3. The method of claim 1, further comprising: identifying, using an artificial intelligence, fix commits related to the vulnerability.

4. The method of claim 3, wherein individual fix commits comprise: code changes; and metadata comprising author information, a textual summary of the code changes, and timestamps associated with the code changes.

5. The method of claim 1, further comprising: obtaining packages from one or more package registries; and determining whether the packages include individual functions of the one or more functions in a vulnerable form or a fixed form.

6. The method of claim 1, wherein performing the comparison comprises: comparing textual representations; or comparing representations of source code, the representations comprising at least one of abstract syntax trees, data flow graphs, control flow graphs, or a form of compiled code.

7. A server comprising:
    one or more processors; and
    one or more non-transitory computer readable media storing instructions executable by the one or more processors to perform operations comprising:

receiving, via a device network, a security advisory comprising a description of a vulnerability associated with a function in a third-party library;

accessing, via the device network, a version control system (VCS) of the third-party library;

identifying, using the VCS of the third-party library, one or more fix commits that address the vulnerability;

determining one or more files corresponding to one or more functions in the third-party library that include the vulnerability;

performing a comparison before a code change was made to the one or more files and after the code change was made to the one or more files;

identifying, based on the comparison, individual functions of the one or more functions that included the vulnerability and have been modified to address the vulnerability;

determining a set of functions that are not directly related to the vulnerability;

performing a search, by excluding from the search the set of functions that are not directly related to the vulnerability, for component versions that include the individual functions that included the vulnerability;

generating an enriched vulnerability description that includes identifiers of package versions that include:
fixed versions of the one or more functions; and
vulnerable versions of the one or more functions; and modifying project code in a development system to use the fixed versions of the one or more functions.

8. The server of claim 7, wherein the description of the vulnerability includes: a potential impact of a security issue associated with the vulnerability including: software affected by the security issue; or hardware affected by the security issue.

9. The server of claim 7, further comprising: identifying, using an artificial intelligence, fix commits related to the vulnerability.

10. The server of claim 9, wherein individual fix commits comprise: code changes; and metadata comprising author information, a textual summary of the code changes, and timestamps associated with the code changes.

11. The server of claim 7, further comprising: obtaining packages from one or more package registries; and determining whether the packages include individual functions of the one or more functions in a vulnerable form or a fixed form.

12. The server of claim 7, wherein performing the comparison comprises: comparing textual representations; or comparing representations of source code, the representations comprising at least one of abstract syntax trees, data flow graphs, control flow graphs, or a form of compiled code.

13. One or more non-transitory computer readable media capable of storing instructions executable by one or more processors to perform operations comprising:

receiving, via a device network, a security advisory comprising a description of a vulnerability associated with a function in a third-party library;

accessing, via the device network, a version control system (VCS) of the third-party library;

identifying, using the VCS of the third-party library, one or more fix commits that address the vulnerability;

determining one or more files corresponding to one or more functions in the third-party library that include the vulnerability;

performing a comparison before a code change was made to the one or more files and after the code change was made to the one or more files;

identifying, based on the comparison, individual functions of the one or more functions that included the vulnerability and have been modified to address the vulnerability;

determining a set of functions that are not directly related to the vulnerability;

performing a search, and excluding from the search the set of functions that are not directly related to the vulnerability, for component versions that include the individual functions that included the vulnerability;

generating an enriched vulnerability description that includes identifiers of package versions that include:
fixed versions of the one or more functions; and
vulnerable versions of the one or more functions; and modifying project code in a development system to use the fixed versions of the one or more functions.

14. The one or more non-transitory computer readable media of claim 13, wherein the description of the vulnerability includes: a potential impact of a security issue associated with the vulnerability including: software affected by the security issue; or hardware affected by the security issue.

15. The one or more non-transitory computer readable media of claim 13, further comprising: identifying, using an artificial intelligence, fix commits related to the vulnerability, the fix commits including code changes and metadata comprising author information, a textual summary of the code changes, and timestamps associated with the code changes.

16. The one or more non-transitory computer readable media of claim 13, further comprising: obtaining packages from one or more package registries; and determining whether the packages include individual functions of the one or more functions in a vulnerable form or a fixed form.

17. The one or more non-transitory computer readable media of claim 13, wherein: the third-party library comprises an open-source library; and the security advisory is received from a security database.

* * * * *